United States Patent [19]

Gilst et al.

[11] 4,252,083

[45] Feb. 24, 1981

[54] LIVESTOCK FEEDER SYSTEM WITH WATER LEVEL CONTROL

[75] Inventors: Carl V. Gilst; Ingmar Kallin, both of Goshen, Ind.

[73] Assignee: Chore-Time Equipment, Inc., Milford, Id.

[21] Appl. No.: 35,736

[22] Filed: May 3, 1979

[51] Int. Cl.³ .......................... A01K 5/02; A01K 7/02
[52] U.S. Cl. .............................. 119/51.11; 119/51.5
[58] Field of Search ................... 119/51.5, 51.11, 56, 119/52 AF

[56] References Cited

U.S. PATENT DOCUMENTS

| | | | |
|---|---|---|---|
| 3,265,036 | 8/1966 | Kloss | 119/51.5 X |
| 3,313,272 | 4/1967 | Moloney | 119/51.11 |
| 3,561,403 | 2/1971 | Wilson, Jr. et al. | 119/51.11 |
| 3,585,969 | 6/1971 | Crane et al. | 119/51.5 |

*Primary Examiner*—Hugh R. Chamblee
*Attorney, Agent, or Firm*—Trexler, Wolters, Bushnell & Fosse, Ltd.

[57] ABSTRACT

There is disclosed a system for dispensing feed and water for livestock which includes a container arranged to receive the feed and water and is adapted to permit access to the feed and the water by the livestock for consumption. The system further includes a feed delivery means for dispensing feed into the container and water dispensing means for dispensing water into the container means. The water dispensing means includes a delivery portion extending into the container which houses a water level sensor. A control means is arranged to actuate the feed delivery means to dispense a controlled amount of feed into the container and is also arranged to actuate the water dispensing means to dispense water into the container through the delivery portion after actuation of the feed delivery means. The water level sensor within the delivery portion disables the water dispensing means after a predetermined level of water within the container is reached and the delivery portion is arranged within the container for washing residual feed within the container from the delivery portion to thereby preclude interference or clogging of the delivery portion and the water level sensor by the residual feed.

12 Claims, 4 Drawing Figures

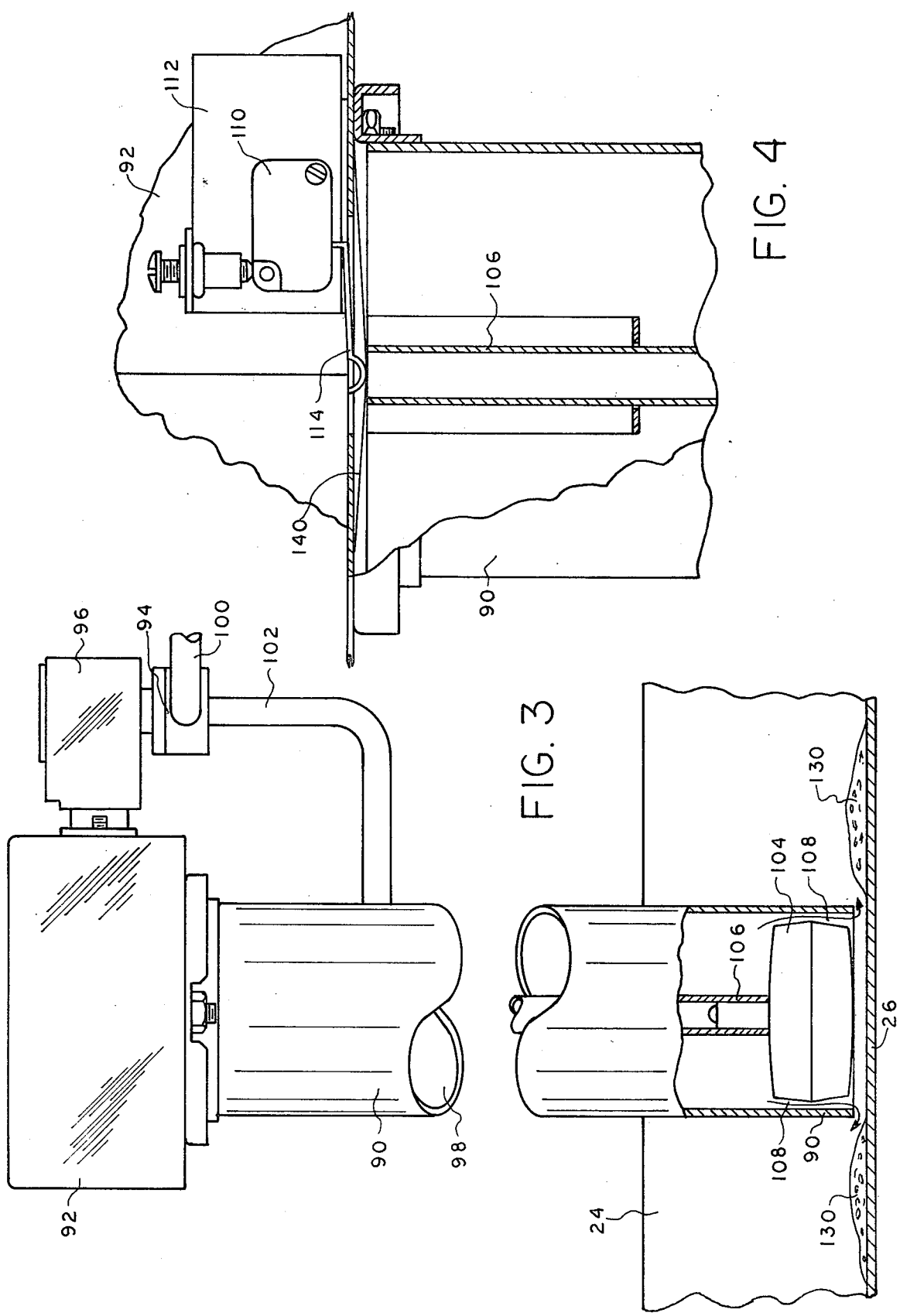

LIVESTOCK FEEDER SYSTEM WITH WATER LEVEL CONTROL

BACKGROUND OF THE INVENTION

The present invention is generally directed to a new and improved feeder apparatus, and more particularly to an apparatus for feeding livestock which includes a novel water dispenser and water level control.

In the raising of livestock, it has been determined that the quality of livestock produced is enhanced by feeding the livestock at predetermined intervals on a restricted basis. For example, in the raising of hogs, and particularly female hogs during their gestation period, increased efficiency of feed conversion and improved quality of the produced animals results when the hogs are fed predetermined or limited amounts of feed and water at specified intervals.

Because a great number of livestock are raised at any one time, in order to take advantage of restricted feeding of the livestock, it is necessary to provide a feeding system which not only provides access to the feed and water by all the animals but in addition, does so on a restricted basis. Both the quantity of feed to be consumed by the animals and the volume of water consumed by the animals must be controlled. Furthermore, in order to assure maximum feed conversion, the water is preferably presented to the animals after the animals have had sufficient time to consume the feed.

It is therefore a general object of the present invention to provide a new and improved system for dispensing feed and water to livestock on a restricted basis.

It is a further object of the present invention to provide such a system wherein the feed is presented to the livestock for consumption and, after a predetermined time interval subsequent thereto, a controlled amount of water is presented to the animals for consumption.

It is a more particular object of the present invention to provide a system for dispensing feed and water to livestock which includes a new and improved water dispenser which includes a novel water level control and which is arranged to wash residual feed away from the water dispenser and the level control to preclude interference or clogging of the same by the residual feed.

The invention therefore provides a system for dispensing feed and water to livestock comprising container means arranged to receive the feed and water and adapted to permit access to the feed and water by the livestock for consumption, feed delivery means for dispensing feed into the container means, water dispensing means for dispensing water into the container means and including a delivery portion extending into the container means, and control means for actuating the feed delivery means and water dispensing means. The control means is arranged to actuate and cause the feed delivery means to dispense a controlled amount of feed into the container means and to actuate and cause the water dispensing means to dispense water into the container means through the delivery portion at a predetermined time after actuating the feed delivery means. The water delivery portion of the water dispensing means includes a water level control for disabling the water dispensing means upon reaching a predetermined level of water within the container means and is arranged within the container means for washing residual feed within the container means from the delivery portion to thereby preclude interference or clogging of the delivery portion by the residual feed.

The invention also provides a water dispenser for use in a feed system of the type which supplies feed and water to livestock and which includes a container for receiving the feed and water. The water dispenser includes a delivery portion extending into the container for delivering water to the container, a water level sensor within the delivery portion, and a valve means coupled to a source of water to be dispensed and to the delivery portion. The water level sensing means is arranged to close the valve means upon sensing a predetermined level of water within the container.

BRIEF DESCRIPTION OF THE DRAWINGS

The features of the present invention which are believed to be novel are set forth with particularity in the appended claims. The invention, together with further objects and advantages thereof, may best be appreciated by making reference to the following description taken in conjunction with the accompanying drawings, in the several figures of which like reference numerals identify identical elements, and wherein:

FIG. 3 is an exploded side view, to an enlarged scale, and partially in cross-section with portions broken away illustrating a water dispenser embodying the present invention and which forms a part of the feed and water dispensing system of FIGS. 1 and 2; and FIG. 4 is a partial side view to an enlarged scale and partially in cross-section of the water dispenser of FIG. 3.

DESCRIPTION OF THE PREFERRED EMBODIMENT

Figure 1:
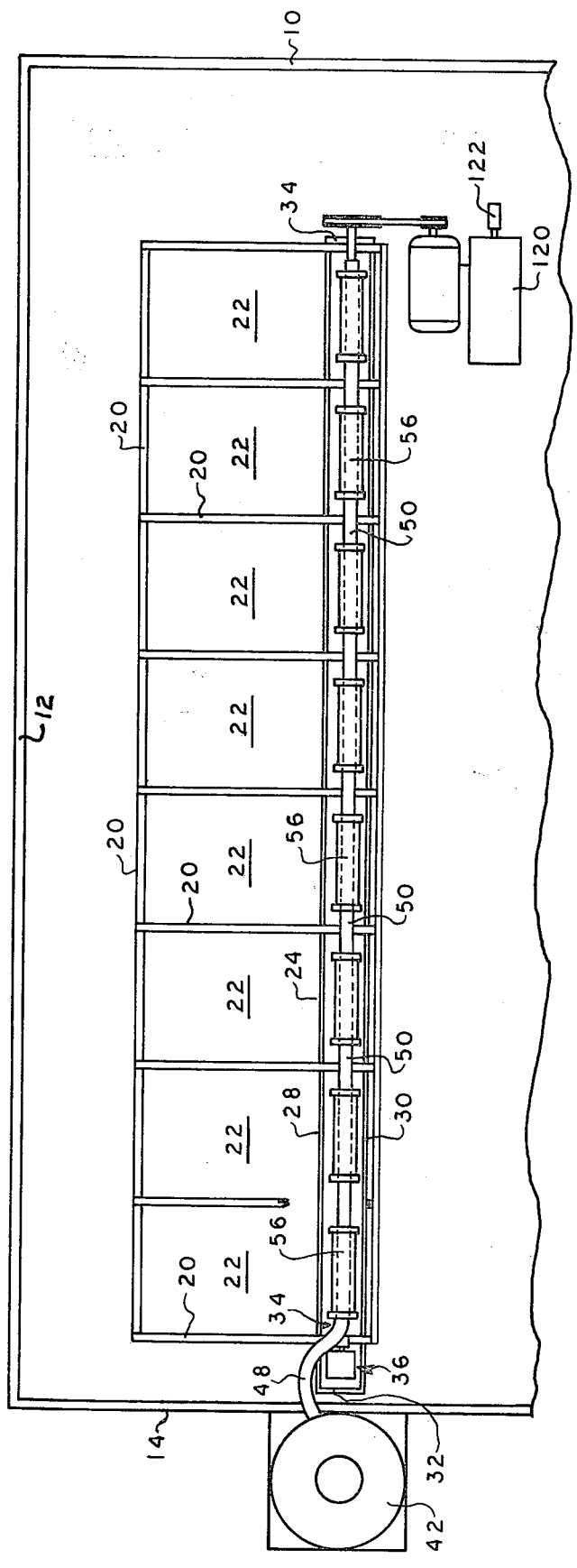
FIG. 1 is a top plan view of a livestock breeding shelter incorporating a feed and water dispensing system embodying the present invention.
Figure 2:
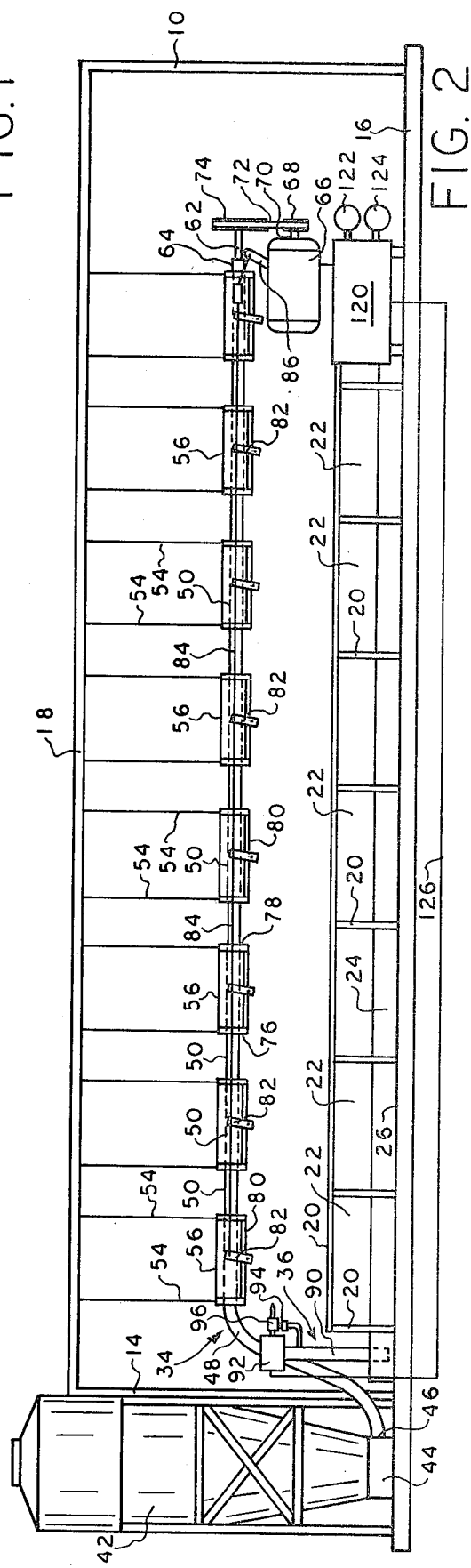
FIG. 2 is a side plan view of the livestock breeding shelter of FIG. 1 illustrating additional details of the feed and water dispensing system embodying the present invention.

Referring now to FIGS. 1 and 2, the livestock shelter there shown includes a plurality of sidewalls 10, 12 and 14, a base or floor 16, and a roof 18. Within the shelter and extending upwardly from the floor 16 are a plurality of fence portions which are arranged to form a plurality of animal pens 22. Each of the pens 22 is sized to accommodate, preferably, a plurality of livestock animals such as hogs. The pens 22 are further arranged in a linear or in-line manner to form a row of pens as illustrated. While only one such row of pens 22 is illustrated in the figure, as will be appreciated hereinafter, additional rows of pens may be provided within the livestock shelter without departing from the present invention.

The livestock shelter further includes a container means in the form of an elongated trough 24 which is arranged to receive the feed and water to be dispensed therein by the feed and water dispensing system. The trough 24 extends across all of the pens 22 and includes a bottom 26 and a plurality of sidewalls 28, 30, 32 and 34. The trough 24 is further open at its upper margin to permit access to the feed and water by the livestock within the pens 22 for consumption.

The feed and water dispensing system illustrated in FIGS. 1 and 2 and which embodies the present invention includes a feed delivery means 34 and a water dispensing means 36. The feed delivery means includes a bulk bin 42 or other source of animal feed. The bulk bin 42 may conveniently be located outside of the wall 14 of the shelter. The bulk bin 42 has a fitting or boot 44 at its lower end providing a discharge opening 46 which is connected with a tube 48 extending upwardly from the lower end of the bin to a level above the animal pens 22. The tube 48 is curved so as to extend from the upwardly inclinded bottom of the boot 44 for connection with a substantially horizontally extending straight tube 50 disposed over the pens 22. The tube 50 may be made up from a plurality of axially connected sections and is supported from the roof 18 of the shelter by cables, chains, or other suitable hanger elements 54. Dispensing or dumping units 56 are mounted on the tube 50 at spaced intervals and over the trough 24 in correspondence to the individual animal pens 22.

In order to transfer the feed from the lower end of the bulk bin 42 to each of the dispensing or dumping units 56, an elongated helical auger (not shown) extends throughout the length of the tube 50. The auger is preferably in the form of a centerless flexible and resilient helical spring-like member so that it is adapted to extend through the curved portions of the tube 48 or around any other curves or corners which may be necessary or desirable to provide in the tubing for a particular installation.

The spring auger extends continuously from the lower fitting or boot 44 on the bulk bin 42. The downstream end of the auger is secured and anchored to a drive shaft 62 which is rotatably supported by a bearing unit 64. The normal length of the spring auger is correlated with the distance between the boot 44 and the drive shaft 62.

The drive shaft 62 is connected with a suitable prime mover such as an electric motor 66 through a speed reducing means. In the embodiment shown, the speed reducing means comprises a small pulley 68 fixed on the motor shaft 70 and driving an endless belt 72 which encircles a large pulley 74 on the drive shaft 62. It is to be understood that any suitable power transmitting means or speed reducing gear unit could be used.

When the motor 66 is energized, the helical spring auger is rotated so that feed is drawn from the fitting or boot 44 at the bottom of the bin 42 upwardly through the tube 48 and along the length of the tube 50. Openings are provided in the bottom of the tube 50 at spaced intervals and in alignment with each of the dispensing or dumping units 56. The openings may be in the form of elongated slots respectively extending from substantially the full length of their associated dumping or dispensing units 56. Thus, as the feed is drawn through the tube 50, portions of the feed fall through the successive openings so that the dispensing or dumping units 56 are progressively filled. As each unit 56 becomes filled, the level of the feed therein rises sufficiently to block the openings associated therewith for preventing excessive filling. When the endmost unit at the downstream end of the tube 50 is filled, the control means described hereinafter de-energizes the motor 66.

The feed delivery system thus far described is fully described and illustrated in U.S. Pat. No. 3,325,055 which issued on June 13, 1967, to the assignee of the present invention. That patent is incorporated herein by reference and may be referred to for a more detailed description of the feed delivery system.

Referring again to FIGS. 1 and 2, each of the dumping units 56 comprises an elongated box or container including opposite end members 76 and 78 having apertures therethrough for receiving the tube 50. Each of the dumping units further includes a hinged bottom 80. Each of the bottoms 80 is maintained in a closed position by a corresponding latch member 82. The latch members 82 are coupled together by a coupling member 84 which terminates at an arm 86. After the dumping units 56 are filled with feed to be dispensed, the arm 86 is displaced to cause the latches 82 to unlock the hinged bottoms 80 for dispensing the feed from the dumping units 56 into the trough 24. The bottoms 80 are further spring mounted so that the weight of the feed within the dumping units 56 causes the bottoms 80 to open and the spring mounting of the bottoms 80 thereafter to cause the bottoms 80 to return to their closed and locked positions after the feed has been dispensed into the trough 24.

The water dispensing means includes a water delivery portion 90, a control housing 92 which houses a control element to be described hereinafter, a valve 94, and a solenoid 96. As can be best seen in FIG. 3, the delivery portion 90 comprises a tubular section having a hollowed out portion 98. The tubular section 90 extends into the trough 24 at one end thereof and terminates proximate to and closely spaced from the bottom 26. The valve 94 includes an inlet 100 adapting the valve 94 for connection to a source of water (not shown). The valve 94 is coupled to the tubular section 90 by a coupling conduit 102 for delivering the water to be dispensed into the trough 24 from the valve 94 to the tubular section 90.

Mounted to the valve 94 is the solenoid 96. The solenoid 96 is arranged to open and close the valve 94 in a controlled manner to be described hereinafter. The solenoid 96 is in turn coupled to a control element within the housing 92. Within the tubular section 90 there is disposed a water level sensing means in the form of a float 104. The float 104 is coupled to a shaft 106 which extends axially through the tubular section 90. The float 104 is smaller in diameter dimension than the inner diameter dimension of the tubular section 90 so as to provide an annular space or channel 108. The annular channel permits the water to be dispensed into the trough 24 to flow from the tubular section 90 into the trough 24.

Referring now to FIG. 4, within the housing 92, there is provided a micro-switch 110 which is mounted to an internal wall 112 of the housing 92. The switch 110 includes a control arm 140 which is arranged to engage the shaft 106 which extends axially from the float 104. The switch 110 is also coupled to the solenoid 96 in any well known manner for actuating the solenoid 96 to thereby close the valve 94.

Referring once again to FIGS. 1 and 2, it can there be noted in accordance with a particular feature of the present invention that the feed delivery means 34 and water dispensing means 36 are coupled to and controlled by a control means comprising a control panel 120 and first and second timers 122 and 124. The first timer 122 is arranged to cause the control panel 120 to actuate the motor 66 to deliver feed to the dumping units 56 and to energize the arm 86 to cause the dumping units to dispense the feed into the trough 24. The second timer 124 is arranged to cause the control panel 120 to disable the water dispensing means 36 for a predetermined time period after actuating the latches 82 of the dumping units 56 and to thereafter actuate the valve 94 of the water dispensing means 36 to cause water to be dispensed into the trough 24. To that end, the control panel 120 is coupled to the housing 92 of the water dispensing means 36 by a line 126.

The timers 122 and 124 may preferably be a type well known in the art having a plurality of pins which are individually selectable for initiating a timed control cycle. Preferably, the livestock could be fed once each day with a controlled amount of feed. The amount of feed to be fed to the livestock is controlled in a manner as described previously.

In operation, the first timer 122 causes the control panel 120 to energize the motor 66. The motor 66 remains energized until all of the dumping units 56 are filled with feed. After the dumping units 56 are filled with feed, the arm 86 is actuated to cause the latches 82 to release the bottoms 80 of the dumping units 56. The weight of the feed acts against the spring pressure of the spring mounting arrangement of the bottoms 80 and causes the bottoms 80 to open to thereby dispense the feed into the trough 24. After the feed has been dispensed from the dumping units 56, the spring mounting arrangement of the bottoms 80 cause the bottoms to return to their closed and locked positions.

After the feed has been dispensed into the trough 24, the second timer 124 causes the control panel 120 to disable the water dispensing means 36. The water dispensing means 36 remains disabled for a predetermined time period, such as, for example, two hours, to provide the livestock with sufficient time to consume the feed dispensed into the trough. During this time, the solenoid 96 which controls the valve 94 is disabled precluding inadvertent enabling of the water dispensing means 36.

Upon the completion of the predetermined time interval, after the livestock have had sufficient time to consume the feed dispensed into the trough 24, the second timer 124 enables the solenoid 96 to thus cause the solenoid 96 to open the valve 94. Water then flows from the water source, through the coupling member 100, the valve 94 and the coupling conduit 102 into the tubular section or delivery portion 90. The water then flows downwardly through the tubular section 90 and through the annular passage 108. By virtue of the annular passage 108, and because of the close spacing between the terminal end of the tubular section 90 and the bottom 26 of the trough 24, turbulent flow of water is created around the tubular section 90 and the water level sensing float 104 to wash residual feed remaining in the trough away therefrom to preclude interference or clogging of the float 104 and the water dispenser by the residual feed. Also, because the delivery portion 90 is at one end of the trough 24, the residual feed will further be displaced toward the livestock for consumption. As water enters the trough 24, the float 100 will rise as a result of being acted upon by the water level within the trough. When a predetermined water level has been reached within the trough 24, the shaft 106 will engage the switch arm 114 to cause the micro-switch 110 to close. When the switch 110 closes, the solenoid 96 is actuated for closing the valve 94 to terminate the dispensing of water into the trough 24. As a result, a controlled amount of water is introduced into the trough at a preset time following feeding of the livestock.

While a particular embodiment of the present invention has been shown and described, modifications may be made, and it is therefore intended to cover in the appended claims all such changes and modifications which fall within the true spirit and scope of the invention.

The invention is claimed as follows:

1. A system for dispensing feed and water to livestock comprising: container means including a bottom wall arranged to receive the feed and water and adapted to permit access to the feed and water by the livestock for consumption; feed delivery means for dispensing feed into said container means; water dispensing means for dispensing water into said container means and including a delivery portion extending into said container means; and control means for actuating and causing said feed delivery means to dispense a controlled amount of feed into said container means and for thereafter actuating and causing said water dispensing means to dispense water into said container means through said delivery portion after the feed delivery means has been actuated and a predetermined livestock feed consumption time has elapsed, said delivery portion of said water dispensing means terminating proximate to said container means bottom wall and being arranged for directing the water at said bottom wall for washing feed away from said delivery portion to thereby preclude interference or clogging of said delivery portion by said feed.

2. A system as defined in claim 1 wherein said control means further includes a first time clock for periodically actuating said feed delivery means and a second time clock for thereafter actuating said water dispensing means.

3. A system as defined in claim 1 wherein said control means further includes means for disabling said water dispensing means during said predetermined livestock feed consumption time interval.

4. A system as defined in claim 1 wherein said water dispensing means includes water level sensing means within said delivery portion for detecting the water level within said container means, and deactuating means responsive to said water level sensing means for deactuating said water dispensing means when the water within said container means reaches a predetermined depth.

5. A system as defined in claim 4 wherein said water dispensing means includes a valve adapted to be coupled to a source of water, wherein said delivery portion comprises a tubular section extending into said container means and terminating closely adjacent to said container means bottom wall, wherein said water level sensing means comprises a float within said tubular section coupled to said deactuating means, and wherein said deactuating means is coupled to said valve for closing said valve responsive to the position of said float.

6. A system as defined in claim 5 wherein said deactuating means comprises a switch having a control arm and wherein said float includes a shaft extension extending through said tubular section and arranged to engage said switch arm when said float senses that the water within said container means has reached said predetermined depth.

7. A system as defined in claim 5 wherein said tubular section is coupled to said valve for receiving the water to be dispensed into said container means and wherein said float is smaller in dimension than the inner dimension of said tubular section to form an annular passage therebetween for passing the water into said container and for promoting turbulent water flow at the end of said tubular section for washing said feed away therefrom.

8. A system as defined in claim 7 wherein said container means comprises an elongated trough and wherein said water dispensing means is positioned at one end of said trough.

9. A system for dispensing feed and water for livestock consumption comprising: container means including a bottom wall arranged to receive the feed and water and adapted to permit access to the feed and water by the livestock for consumption; feed delivery means for dispensing feed into said container means; water dispensing means for dispensing water into said container means and including a housing extending into the container means and water level sensing float means for disabling said water dispensing means responsive to a predetermined water level within said container means housing being reached; and control means for actuating said feed delivery means for causing said feed delivery means to dispense the feed into said container means and for enabling said water dispensing means at a predetermined time after actuating said feed delivery means; said water dispensing means being arranged with respect to said container means bottom wall and said water level sensing means for simultaneously washing feed within said container away from said water dispensing means and from said water level sensing means upon dispensing water into said container means to preclude interference or clogging of said water dispensing means and said water level sensing means by the feed.

10. A system as defined in claim 9 further comprising a valve and a switch, wherein said switch is coupled to said valve and arranged to be engaged by said float means when said predetermined water level is reached for actuating said valve and disabling said water dispensing means.

11. A system as defined in claim 10 wherein said float means is of lesser dimension than said housing to form a peripheral channel within said housing through which the dispensed water passes, and wherein said housing terminates proximate to the bottom of said container means to promote turbulent water flow around said housing for washing the feed therefrom.

12. A system for dispensing feed and water to livestock comprising: container means including a bottom wall arranged to receive the feed and water and adapted to permit access to the feed and water by the livestock for consumption; feed delivery means for dispensing feed into said container means; water dispensing means for dispensing water into said container means and including a delivery tube portion extending into said container means; and control means for actuating and causing said feed delivery means to dispense a controlled amount of feed into said container means and for actuating and causing said water dispensing means to dispense water into said container means through said delivery tube portion after actuating said feed delivery means, said delivery tube portion of said water dispensing means terminating proximate to said container means bottom wall and being arranged for directing the water at said bottom wall for washing feed away from said delivery portion to thereby preclude interference or clogging of said delivery portion by said feed, the control means further including a float member disposed within the water delivery tube and a water delivery deactuating means connected to the float member for halting water delivery when the water within the container reaches a predetermined depth.

* * * * *

UNITED STATES PATENT AND TRADEMARK OFFICE
CERTIFICATE OF CORRECTION

PATENT NO. : 4,252,083
DATED : February 24, 1981
INVENTOR(S) : CARL VAN GILST, INGMAR KALLIN It is certified that error appears in the above-identified patent and that said Letters Patent are hereby corrected as shown below:

Change first inventor "Carl V. Gilst" to --Carl Van Gilst--;

Column 5, line 52, change "float 100" to --float 104--.

Signed and Sealed this

Thirtieth Day of June 1981

[SEAL]

Attest:

RENE D. TEGTMEYER

Attesting Officer

Acting Commissioner of Patents and Trademarks